(12) United States Patent
Revankar et al.

(10) Patent No.: US 7,691,351 B2
(45) Date of Patent: Apr. 6, 2010

(54) METHOD FOR TREATMENT OF A GAS STREAM CONTAINING SILICON TETRAFLUORIDE AND HYDROGEN CHLORIDE

(75) Inventors: Vithal Revankar, Seabrook, TX (US); Jameel Ibrahim, Humble, TX (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 56 days.

(21) Appl. No.: 12/202,807

(22) Filed: Sep. 2, 2008

(65) Prior Publication Data

US 2009/0092530 A1    Apr. 9, 2009

Related U.S. Application Data

(60) Provisional application No. 60/969,836, filed on Sep. 4, 2007.

(51) Int. Cl.
  *B01D 53/50* (2006.01)
  *B01D 53/68* (2006.01)
  *B01D 53/70* (2006.01)

(52) U.S. Cl. .................. 423/240 R; 423/481; 423/488; 423/341; 423/466; 423/489; 423/240 S; 423/491; 423/497; 423/498

(58) Field of Classification Search .............. 423/240 R, 423/240 S, 241, 481, 488, 341, 466, 489, 423/491, 497, 498
See application file for complete search history.

(56) References Cited

U.S. PATENT DOCUMENTS

| | | | |
|---|---|---|---|
| 4,557,921 A | * | 12/1985 | Kirsch et al. ................. 423/488 |
| 5,597,540 A | * | 1/1997 | Akita et al. .................. 423/241 |
| 2003/0082918 A1 | * | 5/2003 | Hayasaka et al. ........... 438/706 |
| 2004/0107833 A1 | | 6/2004 | Sweeney et al. |

FOREIGN PATENT DOCUMENTS

IE    76293    10/1997

* cited by examiner

*Primary Examiner*—Steven Bos
*Assistant Examiner*—Pritesh Darji
(74) *Attorney, Agent, or Firm*—Armstrong Teasdale LLP

(57) ABSTRACT

The present invention is directed to a method for treatment of a gas stream comprising silicon tetrafluoride and hydrogen chloride. For example, the present invention is directed to a method for treatment of such a gas stream that involves contacting the gas stream with a metal that reacts with the hydrogen chloride to provide a treated gas stream having reduced hydrogen chloride content. The present invention is further directed to methods for subjecting silicon tetrafluoride and hydrogen chloride-containing gas streams to elevated pressure to provide gas streams suitable for transport.

68 Claims, 1 Drawing Sheet

METHOD FOR TREATMENT OF A GAS STREAM CONTAINING SILICON TETRAFLUORIDE AND HYDROGEN CHLORIDE

CROSS-REFERENCE TO RELATED APPLICATIONS

This application claims the benefit of U.S. Provisional Application No. 60/969,836, filed Sep. 4, 2007.

FIELD OF THE INVENTION

The present invention is directed to a method for treatment of a gas stream comprising silicon tetrafluoride and hydrogen chloride. For example, the present invention is directed to a method for treatment of such a gas stream that involves contacting the gas stream with a metal that reacts with the hydrogen chloride to provide a treated gas stream having reduced hydrogen chloride content. The present invention is further directed to methods for subjecting silicon tetrafluoride and hydrogen chloride-containing gas streams to elevated pressure to provide gas streams suitable for transport.

BACKGROUND OF THE INVENTION

Silicon tetrafluoride(STF)-containing gas streams may be produced by decomposing fluorosilicic acid (FSA) in the presence of a sulfuric acid catalyst.

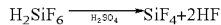

$$H_2SiF_6 \xrightarrow{H_2SO_4} SiF_4 + 2HF$$

STF-containing gas streams produced in this manner often include halide-containing impurities (e.g., hydrogen chloride). For example, FSA utilized in commercial processes for the manufacture of silicon tetrafluoride is often derived from phosphoric acid plants that utilize naturally occurring calcium phosphate. This ultimately results in hydrogen chloride being present in the silicon tetrafluoride product since the calcium phosphate sources typically include one or more contaminants including, for example, calcium chloride. The presence of hydrogen chloride in the STF product stream is undesired as it may, in combination with moisture also present in the product stream, result in corrosion of equipment (e.g., piping, reactors, tube trailers, etc.) utilized in further processing of the STF product.

Processes for the treatment of gas streams containing silicon tetrafluoride are known including, for example, methods which involve absorbing and decomposing the impurity or impurities in a scrubber (i.e., a "wet" process), while others include cleaning the gas stream by passing the gas through a packed column including a cleaning agent comprising an alkaline component impregnated into a porous carrier such as activated carbon (i.e., a "dry" process). However, both these wet and dry process are typically met with one or more disadvantages. For example, wet processes generally raise issues with respect to further treatment since the waste produced by these processes is an aqueous alkaline solution, and the expense associated therewith.

Processes are also described in the prior art that include treating gas streams to remove harmful gases (e.g., halogenides such as hydrogen chloride and Silicon tetrafluoride) with a cleaning agent comprising zinc oxide, aluminum oxide, and an alkali component. (See, for example, U.S. Pat. No. 5,597,540 to Akita et al.)

There exists an unfulfilled need for a simple and efficient process that provides suitable contaminant removal to provide an STF product stream of suitable purity.

SUMMARY OF THE INVENTION

Briefly, therefore, the present invention is directed to methods for the purification of a silicon tetrafluoride gas stream having a concentration of hydrogen chloride. In various embodiments, the present invention is directed to a process for removing the hydrogen chloride from the silicon tetrafluoride gas. The process comprises contacting the gas stream with a source of a metal, wherein the metal reacts with the hydrogen chloride, thereby preferentially removing hydrogen chloride from the gas stream and providing a treated gas stream comprising silicon tetrafluoride and having a reduced hydrogen chloride content that is no more than about 90% (v/v) of the initial hydrogen chloride content.

In still further embodiments, the present invention is directed to a process for removing hydrogen chloride from a gas stream comprising silicon tetrafluoride and having an initial pressure and initial hydrogen chloride content. The process comprises compressing the gas stream during one or more stages of increasing pressure greater than the initial pressure; and the process further comprises contacting the gas stream with a source of a metal, thereby providing a treated gas stream having a reduced hydrogen chloride content that is no more than about 90% (v/v) of the initial hydrogen chloride content.

DETAILED DESCRIPTION OF THE PREFERRED EMBODIMENTS

Figure 1:
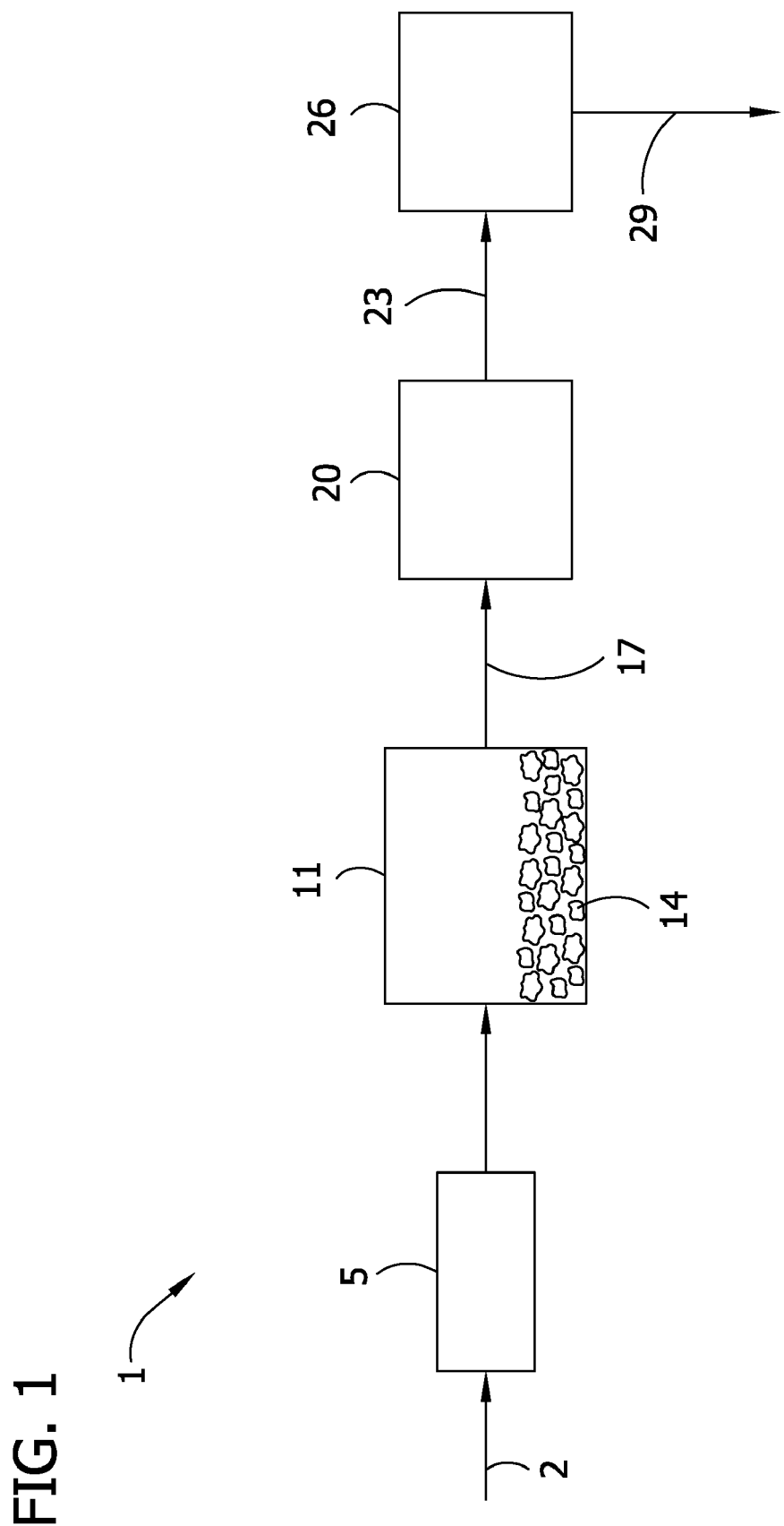
FIG. 1 provides a schematic of the process of the present invention.

The process of the present invention includes contacting a gas stream containing silicon tetrafluoride (STF) and hydrogen chloride with a source of a metal such as zinc that may be utilized to prepare silicon tetrafluoride gas streams having one or more desirable properties. Advantageously, the process of the present invention provides removal of hydrogen chloride from the STF gas stream while providing a STF gas stream of relatively high purity. The metal reacts with hydrogen chloride, thereby removing the contaminant from the STF gas stream, and it has been observed that the metal exhibits selectivity to the impurity to be removed such that the desired STF remains in the treated gas stream. In this regard it is to be noted that impurity removal achieved by the process of the present invention exceeds any incidental removal that may be associated with contact of the gas stream and metal-containing process equipment.

STF-containing gas streams typically include moisture which, in combination with impurities such as hydrogen chloride, often results in corrosion of the equipment used in processing and transport of the gas stream (e.g., piping, reactors, tube trailers, etc.). Typically, STF-containing gas streams are subjected to elevated pressures to provide a gas stream suitable for transport. STF gas streams prepared by the method of the present invention exhibit levels of hydrogen chloride that contribute to reduced corrosion of equipment (e.g., compressors, piping, reactors, tube trailers, etc.) used in transport and/or further processing of the STF gas streams. Often the STF-containing gas streams are subjected to one or more stages of elevated pressure to provide a gas stream suitable for transport. The treatment method of the present invention may be utilized at various points during this processing. For example, the treatment method may be utilized to reduce the hydrogen chloride content of the STF gas stream prior to a single stage of elevated pressure, or may be utilized to reduce the hydrogen chloride after the first of multiple stages of elevated pressure.

Corrosion resistant materials are commercially available (e.g., various metal alloys such as Incoloy, Monel, and Hastelloy), but the cost of these specialty materials is generally prohibitive as to their widespread incorporation in processing and transporting STF-containing gas streams. Thus, the present invention not only provides a stream of high purity STF by virtue of the selective removal of hydrogen chloride, but also provides economic benefits by reducing or eliminating the need for use of specialty materials in processing and transporting STF-containing gas streams.

Impurity Removal

Generally, the process of the present invention includes contacting a gas stream to be treated (e.g., a STF-containing gas stream) with a source of a metal that promotes removal of undesired impurities from the gas stream. For example, STF-containing gas streams typically include one or more impurities such as, for example, hydrogen chloride. In various embodiments, the process involves contacting an STF-containing gas stream with a source of zinc to remove hydrogen chloride from the gas stream in accordance with the following:

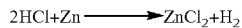

$2HCl + Zn \longrightarrow ZnCl_2 + H_2$

The following discussion focuses on removal of hydrogen chloride from STF-containing gas streams utilizing zinc, but it should be understood that the present invention generally applies to removal of other impurities, and removal of hydrogen chloride and other impurities utilizing metals other than zinc.

As noted, the process of the present invention involves a reactive process in which the impurity is removed by reacting with the metal to produce a species that can be removed from the gas stream. (e.g., when removing hydrogen chloride by contact with a source of zinc, zinc chloride and hydrogen are produced). By way of further example, when hydrogen chloride is removed by contact with a source of magnesium, magnesium chloride and hydrogen are produced. These products may be recovered using conventional methods, and may also represent a useable product. Various known methods for removal of impurities from gas streams containing STF involve removal in the absence of any reaction including, for example, removal of impurities by contact with an absorbent. One disadvantage to such processes is difficulty in achieving preferential removal of the impurity and providing a high purity product. Thus, the reactive process of the present invention represents an advance over such processes since it can be used to remove an impurity while providing a product of relatively high purity.

In particular, in this regard it is to be noted that the present invention is suitable for removal of one gaseous impurity from an STF-containing gas stream containing another gaseous component. This represents an advance over the art since impurity-containing gas streams commonly include a desired STF gaseous component along with the gaseous impurities, and conventional methods (e.g., use of an absorbent) are generally unable to selectively remove the impurity from the gas stream, or at least are generally unable to remove the impurity while providing a product stream of the desired purity. This feature of the present invention may generally be represented by impurity removal efficiency. For example, in various embodiments, the metal generally provides a removal efficiency of the impurity (e.g., hydrogen chloride) of at least about 75%, at least about 80%, at least about 90%, at least about 95%, at least about 98%, or at least about 99.9%. Typically, the impurity removal efficiency is from about 75% to about 99.9%, more typically from about 90% to about 99.9% and, still more typically, from about 95% to about 99.9%.

Without being bound to a particular theory, it is currently believed that the electronegativity of the metal contacted with the STF-containing gas stream for impurity removal contributes, at least in part, to the selective impurity removal. In particular, it has been discovered that various metals having an electronegativity below that of the impurity to be removed (e.g., hydrogen chloride) provide selective impurity removal. For example, in various embodiments (e.g., those in which the impurity to be removed is hydrogen chloride), typically the electronegativity of the metal compared to iron is generally less than about 1.65 (e.g., zinc), less than about 1.55 (e.g., titanium), or less than about 1.3 (e.g., magnesium). Thus, generally metals appearing in Groups 2-4 and 12-14 of the Periodic Table are suitable for use in the process of the present invention. Group numbers are with reference to the current International Union of Pure and Applied Chemistry (IUPAC) numbering system.

The process of the present invention may be used to treat STF and hydrogen chloride-containing gas streams of varying compositions. The STF concentration of the gas stream to be treated is not narrowly critical, and generally may be at least about 80% (by volume), at least about 90% (by volume), at least about 95% (by volume), at least about 98% (by volume), or at least about 99% (by volume). Typically, the desired component of the gas stream is present at a concentration of from about 90% to about 99% (by volume), from about 95% to about 99% (by volume), or from about 98% to about 99% (by volume). It is to be noted that gas stream to be treated in accordance with the process of the present invention may include various inert components in varying proportions. The presence of these inert components does not impact the present process.

Similarly, the hydrogen chloride content may vary within relatively wide ranges but generally is at least about 0.5% (by volume), at least about 1% (by volume), at least about 3% (by volume), or at least about 6% (by volume). Typically, the hydrogen chloride content of the gas stream is from about 0.5% to about 10% (by volume), from about 1% to about 6% (by volume), more typically from about 1.5% to about 4.5% (by volume) and, still more typically, from about 2% to about 4% (by volume).

Moisture contents of STF-containing gas streams to be treated are generally at least about 100 parts per million (ppm), at least about 300 ppm, at least about 800 ppm, or at least about 1700 ppm. Typically, the moisture content of the STF-containing gas stream is from about 100 to about 2500 ppm, from about 300 to about 1700 ppm, from about 300 to about 800 ppm, or from about 400 to about 600 ppm.

As noted, the process of the present invention involves contacting the STF-containing gas stream to be treated with a metal that reacts with an impurity to remove the impurity from the gas stream and provide a treated gas stream. The source of the metal is not narrowly critical and may generally be selected from the group consisting of metal oxides and metal hydroxides of the metals of Groups 2-4 and 12-14, and combinations thereof. In various preferred embodiments, the metal comprises zinc and/or magnesium and, in still further preferred embodiments, the metal comprises or consists essentially of zinc. In the case of metal comprising zinc, the source of metal may comprise zinc oxide, zinc hydroxide, and/or zinc. By way of further example, in the case of metal comprising magnesium, the source of metal may comprise magnesium oxide, magnesium hydroxide, and/or magnesium.

FIG. 1 provides a schematic generally depicting the process of the present invention. As shown, an STF-containing gas stream 2 passes through a low pressure portion of the piping 5 (e.g., a "knock out pot") which serves to remove condensable impurities from the gas stream which then enters vessel 11 and contacts metal source 14. The STF-containing gas stream 17 exiting vessel 11 is then sent a first compressor 20 to provide a first compressed STF-containing gas stream 23. The first compressed STF-containing gas stream 23 then passes to a second compressor 26 to provide a final, treated STF-containing gas stream 29. As detailed elsewhere herein, the process of the present invention is not limited to the arrangement set forth in FIG. 1. For example, in various embodiments, the STF-containing gas stream to be treated may initially travel to a first compressor to provide a compressed gas stream which then contacts the metal source in a vessel, followed by contact of the treated gas stream in one or more subsequent compressors.

To promote sufficient interfacial contact between the STF-containing gas stream and metal, the metal source is typically in a powder, or particulate form. In various embodiments, the STF-containing gas stream is contacted with a bed comprising the metal source. Typically, the metal source may be in the form of a packed bed, fluidized bed, or moving bed. In various preferred embodiments, the metal source is in the form of a packed bed. The pressure drop across a bed of metal source is not narrowly critical and generally depends, for example, on bed design and packing density. Typically, the pressure drop across the bed of metal source is from about 1 to about 25 psig, more typically from about 2 to about 10 psig and, still more typically, from about 3 to about 7 psig.

It is to be noted that the precise form and properties of the metal source are not narrowly critical, but generally are selected to provide intimate contact of the gas stream and metal and also provide sufficient residence time of the gas stream within the bed. Regardless of the precise form of the metal source or a bed comprised thereby, in various embodiments, the metal source is in particulate form having a surface area of at least about 80 $ft^2/ft^3$, at least about 120 $ft^2/ft^3$, or at least about 200 $ft^2/ft^3$. Typically, the surface area of particulate metal source is from about 80 to about 600 $ft^2/ft^3$, more typically from about 120 to about 500 $ft^2/ft^3$ and, still more typically, from about 200 to about 400 $ft^2/ft^3$. In accordance with these and other embodiments, generally at least a portion of the metal source is in the form of particles ranging in size of from about 500 to about 5000 μm, from about 1000 to about 4000 μm, or from about 2000 to about 3000 μm. The porosity of the metal source or a bed comprised thereby likewise is not narrowly critical, but generally is from about 30% to about 80%, more typically from about 40% to about 70% and, still more typically, from about 50% to about 70%.

To promote sufficient interfacial contact between the STF-containing gas stream and metal source, the area and/or mass of metal source per unit volume of gas stream may desirably be at or within certain limits. For example, generally the STF-containing gas stream is contacted with the metal at a rate of at least about 0.05, at least about 0.1, at least about 0.2, or at least about 0.3 pounds (lb) gas stream per hour (hr) $ft^2$ metal source surface area. Typically, the metal source and gas stream are contacted at a rate of from about 0.05 to about 0.5 lb/hr·$ft^2$, from about 0.05 to about lb/hr·$ft^2$, or from about 0.1 to about 0.3 lb/hr·$ft^2$.

In accordance with any or all of the foregoing details concerning the composition of the STF-containing gas stream to be treated, the form of the metal source, etc., the conditions of contact between the metal source and STF-containing gas stream are not narrowly critical. For example, typically the temperature at which the STF-containing gas and metal are contacted is generally at least about 25° C., at least about 35° C., or at least about 45° C. Typically, the contact temperature is from about 25 to about 90° C., more typically from about 35 to about 80° C. and, still more typically, from about 45 to about 70° C. Additionally or alternatively, the pressure at which the STF-containing gas and metal are contacted is generally at least about 50 psig, at least about 250 psig, or at least about 500 psig. Typically, the metal and STF-containing gas are contacted at a pressure of from about 50 to about 1500 psig, more typically from about 250 to about 1250 psig and, still more typically, from about 500 to about 1000 psig.

While not narrowly critical to impurity removal efficiency, the rate at which the stream is contacted with the metal source may indicate and/or contribute to the economics of the process. That is, sufficient removal may generally be achieved over a relatively broad range of gas stream flow rates and, assuming equivalent impurity removal, as the flow rate of the gas increases so to do the economic advantages of the process. Generally, the STF-containing gas stream passes over the bed of metal source at a space velocity of at least about 0.1 ft/minute, at least about 1 ft/minute, at least about 2 ft/minute, or at least about 4 ft/minute. Typically, the gas stream passes over the bed of metal source at a space velocity of from about 0.1 to about 8 ft/minute, from about 0.5 to about 5 ft/minute, or from about 1 to about 4 ft/minute.

Compression of the Gas Streams

As noted, STF-containing gas streams are typically treated (e.g., by compressing) before the streams are transported using metal tubing and/or tube trailers. Typically, STF-containing gas streams are compressed prior to transport to reduce equipment volume needed for transport. For example, the STF-containing gas stream may be compressed during one or more stages that comprise subjecting the stream to increasing, elevated pressures. The process of the present invention reduces the impurity content of the gas stream that may, in combination with moisture present in the gas stream, contribute to corrosion of the equipment during this further processing. In particular, the process of the present invention generally provides a treated STF-containing gas stream having a hydrogen chloride content that is no more than about 90% (by volume), or no more than about 80% (by volume) of the initial hydrogen chloride content of the gas stream. That is, the process of the present invention provides removals of hydrogen chloride well in excess of any incidental removal that may be provided by virtue of contact of the STF-containing gas stream and metal process equipment.

For example, in various embodiments, the stream may be compressed in a first, relatively low pressure compressor that involves subjecting the STF-containing gas stream to a pressure of at least about 100 psig, at least about 200 psig, or at least about 300 psig (e.g., pressures of from about 100 to about 700 psig, from about 200 to about 600 psig, or from about 300 to about 500 psig). The STF-containing gas stream may be further subjected to one or more stages at higher pressures of, for example, at least about 800 psig, at least about 1000 psig, or at least about 1200 psig. In various embodiments, the STF-containing gas stream is subjected to one or more stages of elevated pressures in the range of from about 1000 to about 1800 psig, from about 1200 to about 1600 psig, or from about 1300 to about 1500 psig.

The treatment method of the present invention may be utilized at various points during this processing. For example, impurity removal may be carried out before a first of one or more stages of elevated pressure, or may be carried out between stages of a series of stages of elevated pressure (e.g., after a first stage of elevated pressure, but before one or more subsequent stages). As shown in FIG. 1 and previously noted, treated STF-containing gas stream 4 may be introduced to a first, relatively low pressure compressor 9, followed by further treatment in a second, higher pressure compressor 13.

Regardless of the precise number of stages, STF-containing gas streams having moisture contents of, for example, at least about 100 ppm, at least about 300 ppm, or at least about 800 ppm (e.g., from about 300 to about 1700 ppm), are generally contacted with a metal in accordance with the present method prior to being subjected to elevated pressures.

Treated Gas Streams

As noted, the composition of the STF-containing gas stream to be treated in accordance with the present invention is not narrowly critical. Regardless of the proportions of impurity removed and desired product retained, generally the impurity concentration in the treated STF-containing gas stream is less than about 6% (by volume), less than about 4% (by volume), less than about 2% (by volume), or less than about 1% (by volume). Typically, the impurity content of the treated gas stream is less than about 0.75% (by volume), more typically less than about 0.5% (by volume), still more typically less than about 0.25% (by volume) and, even more typically, less than about 0.1% (by volume). In accordance with these and various other embodiments, the impurity content of treated gas streams may be even lower (e.g., no more than about 500 ppm, no more than about 250 ppm, or no more than about 100 ppm).

Additionally or alternatively, various other features of the treated gas streams may be indicators of process performance. The process of the present invention treats a gas stream having an initial impurity content to provide a treated gas stream having reduced impurity content. For example, in the case of an STF-containing gas stream containing hydrogen chloride as an impurity, the process of the present invention may provide a treated STF-containing gas stream having a reduced hydrogen chloride content that is no more than about 80% (v/v), no more than about 70% (v/v), no more than about 60% (v/v), no more than about 50% (v/v), no more than about 40% (v/v), no more than about 30% (v/v), or no more than about 20% (v/v) of an initial hydrogen chloride content. In accordance with these and various other embodiments even greater impurity removal may be achieved to provide a treated gas stream having a reduced hydrogen chloride content that is no more than about 10% (v/v), no more than about 5% (v/v), no more than about 2.5% (v/v), or no more than about 1% (v/v) (e.g., no more than about 0.5%) of an initial hydrogen chloride content.

Overall impurity removals on the order of those noted above generally provide an advantageous process, but it may be desired for suitable removals to be achieved without requiring periods of process operation of relatively long duration. As the period of time needed for suitable impurity removal decreases, the economic advantages of the process increase. In various embodiments, the process of the present invention has been observed to provide a suitable reduced impurity content during no more than about 60 minutes, no more than about 30 minutes, no more than about 2 minutes, or no more than about 0.1 minutes of contact between the gas stream and source of metal. Typically, suitable reduced impurity content is achieved during from about 0.1 to about 60 minutes of contact, more typically during from about 2 to about 30 minutes of contact and, more typically, during from about 5 to about 15 minutes of contact. In this regard it is to be noted that the process of the present invention may be carried out using single or multiple beds. In the case of multiple beds, the beds may be arranged in series or parallel and residence times within the multiple beds may vary accordingly.

As noted, the process of the present invention represents an advance since it provides preferential impurity removal. Thus, retention of the desired product such as STF in the gas stream likewise can be used as an indicator of process performance. Generally, no more than about 10% (v/v), no more than about 5% (v/v), or no more than about 2% (v/v) of the silicon tetrafluoride originally present in the gas stream to be treated is removed from the gas stream by contact with the source of metal. Greater retention of silicon tetrafluoride may be achieved in accordance with these and other embodiments. For example, typically no more than about 1% (v/v), more typically no more than about 0.5% (v/v) and, still more typically, no more than about 0.25% (v/v) (e.g., no more than about 0.1%) of the STF is removed from the gas stream. That is, in various embodiments the STF content of the treated gas stream may be in excess of 99% (e.g., about 99.9%) of the initial STF content.

The present invention is further illustrated by the following Examples. These Examples are not to be regarded as limiting the scope of the invention or the manner in which it may be practiced.

EXAMPLES

Example 1

This example describes treatment of gas streams containing hydrogen chloride (HCl) and silicon tetrafluoride (STF) in accordance with the present invention. Testing occurred over the course of 14 days. The gas streams contained from approximately 1.6 to 1.9% by volume HCl, approximately 97% by volume STF, and had moisture contents of approximately 600-800 parts per million.

The gas streams were contacted with a packed bed containing approximately 20 g zinc foil at rates of approximately 0.1 lb/hr·ft$^2$. The gas stream and packed bed were contacted at temperatures ranging from approximately 50 to 80° C. and under pressures ranging from approximately 0 to 200 psig. During the course of the testing, HCl contents of the gas streams were reduced to approximately 0.3% to 0.6% (by volume). As shown in Table 1, this represents hydrogen chloride removal efficiencies ranging from approximately 87% to approximately 92%.

TABLE 1

| Days | Temperature | HCl removal efficiency (%) |
|---|---|---|
| 12 days | 80° C. | 87 |
| 13 days | 60° C. | 97 |
| 12 days | 50° C. | 94 |
| 14 days | 60° C. | 92 |

Example 2

This example describes treatment of gas streams containing hydrogen chloride (HCl) and silicon tetrafluoride (STF)

in accordance with the present invention. 3 trials were conducted for durations of (1) 456 hours, (2) 157 hours, and (3) 131 hours.

The gas streams contained from approximately 4 to 6% by volume HCl, approximately 800 to 1700 parts per million.

The gas streams were contacted with a packed bed containing approximately 120 lb zinc oxide at rates of from approximately 0.1 to 0.5 lb/hr·ft$^2$, generally at an average rate of approximately 0.3 lb/hr·ft$^2$. It is to be noted that the packing used in this example included a mixture of zinc metal shavings and turnings, and the zinc surface areas were approximated to provide these rates. Nevertheless, one skilled in the art could produce packing having surface areas within the approximated ranges and vary the flow rates accordingly.

The gas stream and packed bed were contacted at temperatures ranging from approximately 30-80° C. and under pressures ranging from approximately 50 to 400 psig.

During the course of the testing, HCl contents of the gas streams were reduced to contents ranging from approximately 1-4% (by volume). As shown in Tables 2-4, hydrogen chloride removal efficiencies on the order of 90% and above were achieved during the testing.

TABLE 2

Trial (1)

| Time (Hours) | HCl removal efficiency (%) |
|---|---|
| 0 | |
| 0.01 | 4.87804878 |
| 0.5 | 99.58536585 |
| 3 | 99.65853659 |
| 7 | 99.85365854 |
| 15 | 94.23170732 |
| 23 | 97.31707317 |
| 36 | Not determined* |
| 48 | 92.68292683 |
| 72 | Not determined* |
| 96 | Not determined* |
| 120 | Not determined* |
| 144 | Not determined* |
| 168 | Not determined* |
| 168 | Not determined* |
| 192 | Not determined* |
| 216 | 70.73170732 |
| 240 | 70.73170732 |
| 264 | 63.41463415 |
| 288 | 63.41463415 |
| 312 | 60.97560976 |
| 336 | 62.43902439 |
| 360 | 3.658536585 |
| 384 | 56.09756098 |
| 408 | 46.34146341 |
| 432 | 53.65853659 |
| 456 | 7.317073171 |

*HCl removal efficiency was not calculated based on the process being discontinued, or measurements not being taken.

TABLE 3

Trial (2)

| Time (Hours) | HCl removal efficiency (%) |
|---|---|
| 2 | 87.27 |
| 15 | 65.31 |
| 27 | 85.47 |
| 39 | 52.73 |
| 49 | 69.84 |
| 59 | 61.60 |
| 69 | 9.09 |

TABLE 3-continued

Trial (2)

| Time (Hours) | HCl removal efficiency (%) |
|---|---|
| 83 | 26.94 |
| 96 | 64.72 |
| 107 | 21.82 |
| 120 | 90.67 |
| 131 | 65.80 |
| 145 | 34.77 |
| 157 | 46.36 |

TABLE 4

Trial (3)

| Time (Hours) | HCl removal efficiency (%) |
|---|---|
| 2 | 64.58 |
| 15 | 75.00 |
| 27 | 53.13 |
| 39 | 72.50 |
| 49 | 40.48 |
| 59 | 76.67 |
| 69 | 98.93 |
| 83 | 45.61 |
| 96 | 99.44 |
| 107 | 98.37 |
| 120 | 16.19 |
| 131 | 16.19 |

What is claimed is:

1. A process for removing hydrogen chloride from a gas stream comprising silicon tetrafluoride and having an initial hydrogen chloride content, the process comprising contacting the gas stream with a source of a metal, the metal being selected from the group consisting of zinc, magnesium, and combinations thereof, wherein the metal reacts with the hydrogen chloride, thereby preferentially removing hydrogen chloride from the gas stream and providing a treated gas stream comprising silicon tetrafluoride and having a reduced hydrogen chloride content that is no more than about 90% (v/v) of the initial hydrogen chloride content, wherein no more than about 1% (v/v) of the silicon tetrafluoride is removed from the gas stream during said contacting.

2. A process as set forth in claim 1 wherein the gas stream has a moisture content of at least about 100 ppm.

3. A process as set forth in claim 1 wherein the gas stream has a moisture content of from about 100 ppm to about 2500 ppm.

4. A process as set forth in claim 1 wherein the metal exhibits a removal efficiency that is at least about 95%.

5. A process as set forth in claim 1 wherein the reduced hydrogen chloride content is no more than about 10% (v/v) of the initial hydrogen chloride content.

6. A process as set forth in claim 1 wherein the reduced hydrogen chloride content is achieved within about 2 minutes of beginning said contacting.

7. A process as set forth in claim 1 wherein the metal source comprises a metal oxide, metal hydroxide, or a combination thereof.

8. A process as set forth in claim 1 wherein the metal exhibits an electronegativity of less than about 1.65.

9. A process as set forth in claim 1 wherein the metal is zinc and the source of metal is selected from the group consisting of zinc oxide, zinc hydroxide, zinc and combinations thereof.

10. A process as set forth in claim 9 wherein zinc reacts with hydrogen chloride to produce zinc chloride.

11. A process as set forth in claim 1 wherein the metal is magnesium and the source of metal is selected from the group consisting of magnesium oxide, magnesium hydroxide, magnesium and combinations thereof.

12. A process as set forth in claim 11 wherein magnesium reacts with hydrogen chloride to produce magnesium chloride.

13. A process as set forth in claim 1 wherein said contacting is conducted at a temperature of from about 25° C. to about 90° C.

14. A process as set forth in claim 1 wherein said contacting is conducted at a pressure of from about 50 psig to about 1500 psig.

15. A process as set forth in claim 1 wherein the surface area of the metal source is at least about 80 $ft^2/ft^3$.

16. A process as set forth in claim 15 wherein the surface area of the metal source is from about 80 $ft^2/ft^3$ to about 600 $ft^2/ft^3$.

17. A process as set forth in claim 1 wherein the gas stream is contacted with the metal at a rate of at least about 0.05 lb/hr·$ft^2$.

18. A process as set forth in claim 1 wherein the gas stream is contacted with the metal at a rate of from about 0.05 lb/hr·$ft^2$ to about 0.5 lb/hr·$ft^2$.

19. A process as set forth in claim 1 wherein at least a portion of the metal source is in the form of particles ranging in size of from about 500 μm to about 5000 μm.

20. A process as set forth in claim 1 wherein the metal source exhibits a porosity of from about 30% to about 80%.

21. A process as set forth in claim 1 wherein the gas stream is contacted with a bed comprising the metal source.

22. A process as set forth in claim 21 wherein the pressure drop across the bed is from about 1 psig to about 25 psig.

23. A process as set forth in claim 21 wherein the gas stream passes over the bed of metal source at a space velocity of at least about 0.1 ft/minute.

24. A process as set forth in claim 21 wherein the bed is in the form of a packed bed, fluidized bed, or moving bed.

25. A process for removing hydrogen chloride from a gas stream comprising silicon tetrafluoride and having an initial pressure and initial hydrogen chloride content, the process comprising:
compressing the gas stream during one or more stages of increasing pressure greater than said initial pressure; and
contacting the gas stream with a source of a metal, the metal being selected from the group consisting of zinc, magnesium, and combinations thereof, thereby providing a treated gas stream having a reduced hydrogen chloride content that is no more than about 90% (v/v) of the initial hydrogen chloride content, wherein no more than about 1% (v/v) of the silicon tetrafluoride is removed from the gas stream during said contacting.

26. A process as set forth in claim 25 wherein said compressing comprises subjecting the gas stream to a first stage of increasing pressure of at least about 100 psig.

27. A process as set forth in claim 25 wherein said compressing comprises subjecting the gas stream to a first stage of increasing pressure of from about 100 psig to about 700 psig.

28. A process as set forth in claim 26 wherein, prior to said first stage, the gas stream has a moisture content of at least about 100 ppm.

29. A process as set forth in claim 26 wherein, prior to said first stage, the gas stream has a moisture content of from about 100 ppm to about 2500 ppm.

30. A process as set forth in claim 26 wherein said compressing comprises subjecting the gas stream to a second stage of increasing pressure of at least about 800 psig.

31. A process as set forth in claim 26 wherein said compressing comprises subjecting the gas stream to a second stage of increasing pressure of from about 1000 psig to about 1800 psig.

32. A process as set forth in claim 30 wherein, prior to said second stage, the gas stream has a moisture content of at least about 100 ppm.

33. A process as set forth in claim 30 wherein, prior to said second stage, the gas stream has a moisture content of from about 100 ppm to about 2500 ppm.

34. A process as set forth in claim 26 wherein said contacting occurs prior to said first stage.

35. A process as set forth in claim 30 wherein said contacting occurs between said first stage and said second stage.

36. A process as set forth in claim 25 wherein during said contacting the metal reacts with the hydrogen chloride, thereby providing a treated gas stream comprising silicon tetrafluoride and having a reduced hydrogen chloride content.

37. A process as set forth in claim 36 wherein the reduced hydrogen chloride content is no more than about 70% (v/v) of the initial hydrogen chloride content.

38. A process as set forth in claim 36 wherein the reduced hydrogen chloride content is achieved within about 2 minutes of beginning said contacting.

39. A process as set forth in claim 25 wherein the metal is zinc and the source of metal is selected from the group consisting of zinc oxide, zinc hydroxide, zinc and combinations thereof.

40. A process as set forth in claim 39 wherein zinc reacts with hydrogen chloride to produce zinc chloride.

41. A process as set forth in claim 25 wherein said contacting is conducted at a temperature of from about 25° C. to about 90° C.

42. A process as set forth in claim 25 wherein said contacting is conducted at a pressure of from about 50 psig to about 1500 psig.

43. A process as set forth in claim 1 wherein the metal exhibits a removal efficiency that is at least about 90%.

44. A process as set forth in claim 1 wherein the metal exhibits a removal efficiency that is at least about 98%.

45. A process as set forth in claim 1 wherein the metal exhibits a removal efficiency that is at least about 99.9%.

46. A process as set forth in claim 1 wherein the gas stream has a moisture content of from about 300 ppm to about 800 ppm.

47. A process as set forth in claim 1 wherein the reduced hydrogen chloride content is no more than about 5% (v/v) of the initial hydrogen chloride content.

48. A process as set forth in claim 1 wherein the reduced hydrogen chloride content is no more than about 0.5% (v/v) of the initial hydrogen chloride content.

49. A process as set forth in claim 1 wherein no more than about 0.5% (v/v) of the silicon tetrafluoride is removed from the gas stream during said contacting.

50. A process as set forth in claim 1 wherein said contacting is conducted at a temperature of from about 45° C. to about 70° C.

51. A process as set forth in claim 1 wherein the surface area of the metal source is at least about 200 $ft^2/ft^3$.

52. A process as set forth in claim 1 wherein the surface area of the metal source is from about 200 $ft^2/ft^3$ to about 400 $ft^2/ft^3$.

53. A process as set forth in claim 1 wherein at least a portion of the metal source is in the form of particles ranging in size of from about 1000 μm to about 4000 μm.

54. A process as set forth in claim 1 wherein the metal source exhibits a porosity of from about 40% to about 70%.

55. A process as set forth in claim 25 wherein said compressing comprises subjecting the gas stream to a first stage of increasing pressure of at least about 200 psig.

56. A process as set forth in claim 25 wherein, prior to said first stage, the gas stream has a moisture content of at least about 800 ppm.

57. A process as set forth in claim 25 wherein said compressing comprises subjecting the gas stream to a second stage of increasing pressure of at least about 1000 psig.

58. A process as set forth in claim 57 wherein, prior to said second stage, the gas stream has a moisture content of from about 300 ppm to about 1700 ppm.

59. A process as set forth in claim 25 wherein the metal exhibits a removal efficiency that is at least about 95%.

60. A process as set forth in claim 25 wherein the metal exhibits a removal efficiency that is at least about 99.9%.

61. A process as set forth in claim 25 wherein the reduced hydrogen chloride content is no more than about 5% (v/v) of the initial hydrogen chloride content.

62. A process as set forth in claim 25 wherein no more than about 0.1% (v/v) of the silicon tetrafluoride is removed from the gas stream during said contacting.

63. A process as set forth in claim 25 wherein the surface area of the metal source is from about 200 ft$^2$/ft$^3$ to about 400 ft$^2$/ft$^3$.

64. A process as set forth in claim 25 wherein at least a portion of the metal source is in the form of particles ranging in size of from about 1000 μm to about 4000 μm.

65. A process as set forth in claim 25 wherein the metal source exhibits a porosity of from about 40% to about 70%.

66. A process as set forth in claim 25 wherein the gas stream is contacted with a bed comprising the metal source at a space velocity at least about 4 ft/minute.

67. A process as set forth in claim 25 wherein the metal is magnesium and the source of metal is selected from the group consisting of magnesium oxide, magnesium hydroxide, magnesium and combinations thereof.

68. A process as set forth in claim 67 wherein magnesium reacts with hydrogen chloride to produce magnesium chloride.

* * * * *